(12) United States Patent
Cho et al.

(10) Patent No.: US 8,512,622 B2
(45) Date of Patent: Aug. 20, 2013

(54) MANUFACTURING METHOD FOR 3D STRUCTURE OF BIOMATERIALS USING STEREOLITHOGRAPHY TECHNOLOGY AND PRODUCTS BY THE SAME

(75) Inventors: Dong-Woo Cho, Seoul (KR); Hyun-Wook Kang, Gyeongsan-si (KR)

(73) Assignee: Postech Academy-Industry Foundation, Pohang (KR)

(*) Notice: Subject to any disclaimer, the term of this patent is extended or adjusted under 35 U.S.C. 154(b) by 125 days.

(21) Appl. No.: 12/821,259

(22) Filed: Jun. 23, 2010

(65) Prior Publication Data

US 2011/0318528 A1    Dec. 29, 2011

(51) Int. Cl.
*B29C 35/04* (2006.01)

(52) U.S. Cl.
USPC .................. 264/401; 264/225; 264/221

(58) Field of Classification Search
USPC ............................... 264/401, 225, 221
See application file for complete search history.

(56) References Cited

U.S. PATENT DOCUMENTS

| | | | |
|---|---|---|---|
| 7,087,200 B2 * | 8/2006 | Taboas et al. | 264/49 |
| 2004/0258729 A1 * | 12/2004 | Czernuszka et al. | 424/426 |
| 2005/0261283 A1 * | 11/2005 | Sukhatme | 514/222.5 |

FOREIGN PATENT DOCUMENTS

| | | |
|---|---|---|
| JP | 4034758 | 9/2004 |
| JP | 2007-062132 | 3/2007 |
| KR | 10-2004-0102531 | 12/2004 |

OTHER PUBLICATIONS

Hyun-Wook Kang, et al., "Solid freeform fabrication and its application to tissue engineering", in Proceedings of KSME (Korean Society of Mechanical Engineers) 2008 Autume Annual Conference, Nov. 6-7, 2008, pp. 1415-1418.

* cited by examiner

*Primary Examiner* — Joseph S Del Sole
*Assistant Examiner* — David N Brown, II
(74) *Attorney, Agent, or Firm* — Lexyoume IP Meister, PLLC.

(57) ABSTRACT

Disclosed is a manufacturing method for a 3D structure of biomaterials using a stereolithography technology capable of ensuring processability of various biomaterials. The manufacturing method for a 3D structure of biomaterials using a stereolithography technology includes: shaping a 3D sacrificial mold by using the stereolithography device; injecting prepared biomaterials into the sacrificial mold by using a solvent; curing the biomaterials by removing the solvent injected into the sacrificial mold; and acquiring the 3D structure from the cured biomaterials by removing the sacrificial mold.

10 Claims, 9 Drawing Sheets

MANUFACTURING METHOD FOR 3D STRUCTURE OF BIOMATERIALS USING STEREOLITHOGRAPHY TECHNOLOGY AND PRODUCTS BY THE SAME

BACKGROUND OF THE INVENTION (a) Field of the Invention

The present invention relates to a manufacturing method for a 3D structure of biomaterials using a stereolithography technology and products by the same, and more particularly, to a manufacturing method for a 3D structure of biomaterials using a stereolithography technology and products by the same that are capable of ensuring processability of various biomaterials.

(b) Description of the Related Art

Various high-technology industries such as an optical industry, an electronic industry, and a semiconductor industry require methods of processing various forms and materials and the precision is being gradually increased from a micrometer unit to a sub-micrometer unit.

As products become micronized and precise, micro-parts are being developed to a technology of a complete 3D form from the existing 2D and semi-3D technologies. However, most of manufacturing processes have a limit to extend to at complete 3D cubic shape.

A method for manufacturing a 3D micro-scale shape using laser is being researched. For example, a stereolithography technology can manufacture a free 3D structure by utilizing a photo-curable resin.

The stereolithography technology can manufacture a free 3D structure, but has a demerit to process only the photo-curable resin. A photo-curable biomaterial is being commercialized in an extremely limited range. Therefore, there are many difficulties in applying the stereolithography technology to a medical or biological field.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a manufacturing method for a 3D structure of biomaterials using a stereolithography technology and products by the same having advantages of ensuring processability of various biomaterials.

The present invention has been made an effort to provide a manufacturing method for a 3D structure of biomaterials using a stereolithography technology and products by the same having advantages of granting a lot of availabilities to medial and biological fields by processing a free 3D structure utilizing the biomaterials used in the medical or biological field.

An exemplary embodiment of the present invention provides a manufacturing method for a 3D structure of biomaterials using a stereolithography technology that includes: shaping a 3D sacrificial mold by using the stereolithography device; injecting prepared biomaterials into the sacrificial mold by using a solvent; curing the biomaterials by removing the solvent injected into the sacrificial mold; and acquiring the 3D structure from the cured biomaterials by removing the sacrificial mold.

The shaping may include shaping a 2D structure required by radiating light energy acquired from a light source of the stereolithography device to a predetermined portion of a photocurable resin; and shaping the sacrificial mold of a 3D structure by laminating the 2D structure.

The injecting may include preparing the biomaterials mixed with the solvent; and injecting the biomaterials with the solvent into a porous space of the sacrificial mold by using a syringe.

At the preparing, the biomaterial may be one of medically usable synthetic polymers such as PLGA and PLLA, and the solvent may be one of organic solvents. The organic solvent may be used considering characteristics of the biomaterials among chloroform and dioxane.

At the preparing, the biomaterial may be one of medically usable natural polymers such as chitosan and alginate and the solvent may be used considering characteristics of the biomaterials with one of acetic acid solution and distilled water.

The biomaterial may use at least one medically usable biomaterials of PLGA and PLLA which are a degradable synthetic polymer, chitosan and alginate which are a degradable natural polymer, and PMMA bone cement which is a non-degradable biomaterial.

Further, an embodiment of the present invention provides a product manufactured by a manufacturing method for a 3D structure of biomaterials using a stereolithography device.

According to an embodiment of the present invention, since a stereolithography device and a stereolithography technology are used, it is possible to ensure processability manufacturing a 3D structure of various biomaterials.

By processing a free 3D structure by utilizing the biomaterials, it is possible to grant a lot of availabilities to medical and biological fields.

That is, it is possible to manufacture a device and an artificial insertion using the biomaterials in the medical and biological fields and to manufacture a patient customized device.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
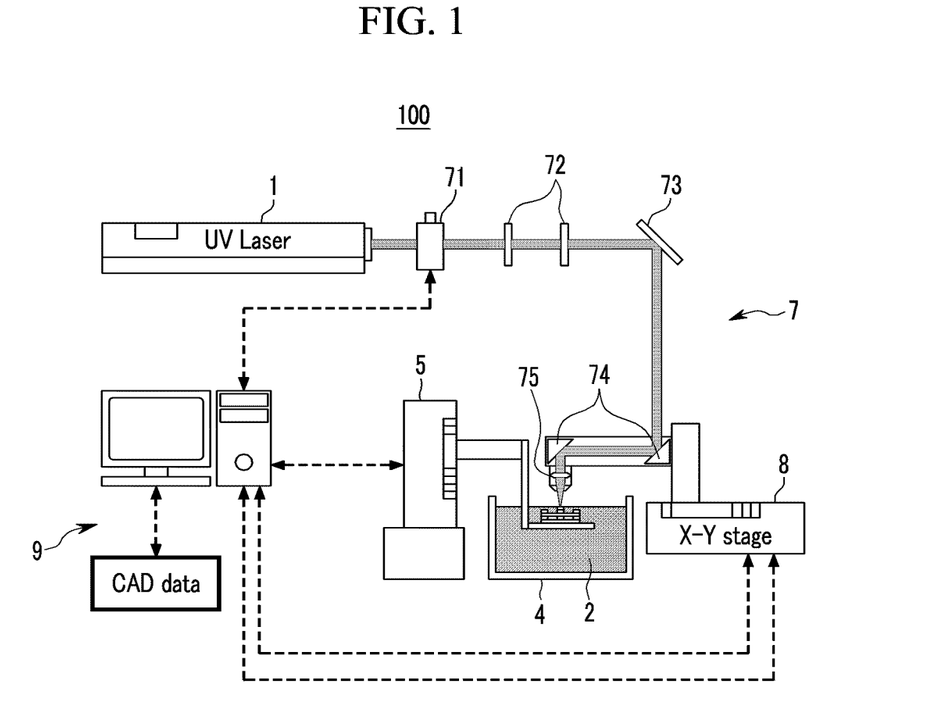
FIG. 1 is a configuration diagram of a stereolithography device used in an exemplary embodiment of the present invention.

FIG. 1 is a configuration diagram of a stereolithography device used in an exemplary embodiment of the present invention. Referring to FIG. 1, a stereolithography device 100 according to an exemplary embodiment of the present invention is formed to implement a stereolithography technology and shapes a sacrificial mold 10 (see FIG. 2) removed after being used as an intermediate medium in order to manufacture a free 3D structure by using biomaterials.

Figure 2:
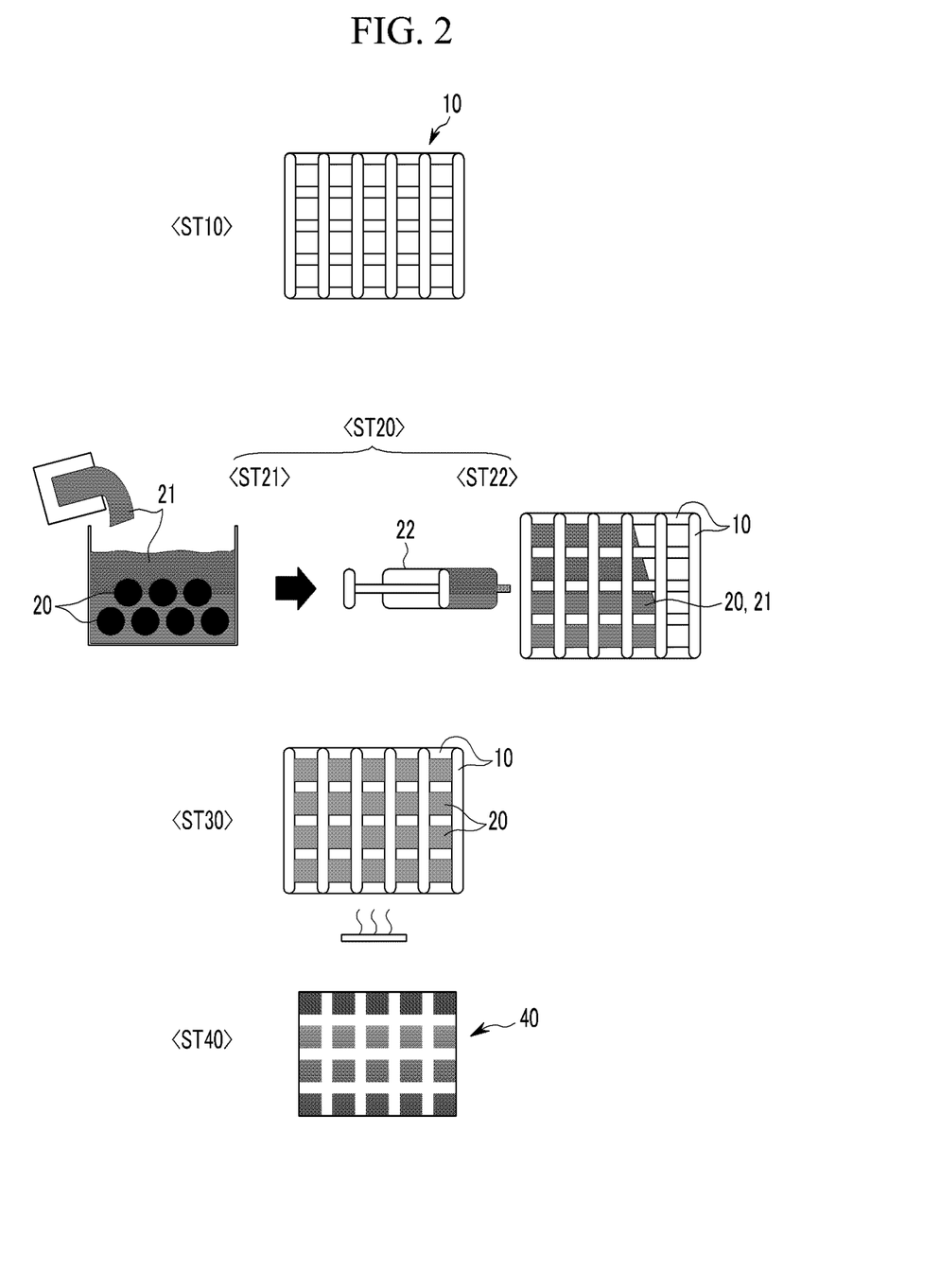
FIG. 2 is a flowchart of a manufacturing method of a 3D structure of biomaterials using a stereolithography device of FIG. 1.

FIG. 2 is a flowchart of a manufacturing method of a 3D structure of biomaterials using a stereolithography device of FIG. 1. Referring to FIG. 2, the manufacturing method of a 3D structure of biomaterials using a stereolithography technology according to the exemplary embodiment of the present invention (for convenience, hereinafter referred to as "manufacturing method") manufactures a product made of the biomaterials, that is, the 3D structure 40 by using the sacrificial mold 10 manufactured by the stereolithography device 100.

The manufacturing method of the exemplary embodiment includes a shaping step (ST10) of shaping the 3D sacrificial mold 10 by using the stereolithography device 100, an injection step (ST20) of injecting prepared biomaterials 20 into the sacrificial mold 10 by using a solvent 21, a curing step (ST30) of curing the biomaterials 20 by removing the solvent 21 injected into the sacrificial mold 10, and a completion step (ST40) of acquiring the 3D structure 40, that is, a product from the cured biomaterials 20 by removing the sacrificial mold 10.

Figure 3:
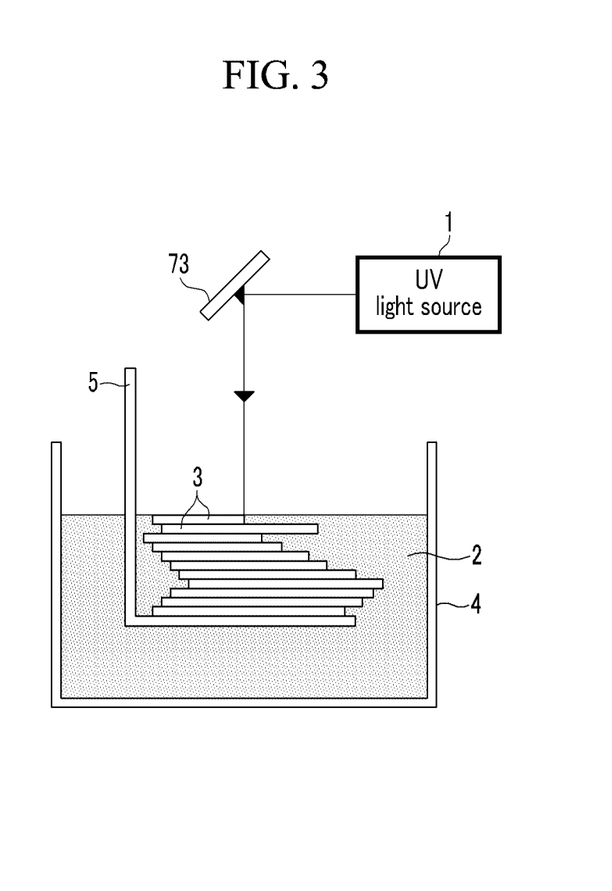
FIG. 3 is a conceptual diagram of a stereolithography technology adopted in a stereolithography device of FIG. 1.

FIG. 3 is a conceptual diagram of a stereolithography technology adopted in a stereolithography device of FIG. 1. Before describing the stereolithography device 100 shaping the sacrificial mold 10, a concept of the stereolithography technology will first be described with reference to FIG. 3.

The stereolithography technology, as a technology with the highest precision among rapid prototyping technologies which are a 3D processing technology, has various commercially available systems.

The stereolithography technology shapes a 2D structure 3 needed by radiating light energy acquired from a light source 1 (i.e., ultraviolet rays) to a predetermined portion of photocurable resin 2 and consecutively piles up the 2D structures 3 shaped as above to manufacture the desired 3D structure, that is, the sacrificial mold 10 of the exemplary embodiment.

Referring back to FIG. 1, the stereolithography device 100 includes a container 4 incorporating the photocurable resin 2, a Z stage 5 piling up the 2D structure 3 made of the photocurable resin 3 in a Z-axis direction within the container 4, a light source 1 generating the light energy, an optical system 7 transmitting the light energy of the light source 1 to the photocurable resin 2, an XY stage 8 controlling the optical system 7 in X-axis and Y-axis directions, and a controller 9 controlling them.

Since Z and XY stages 5 and 8 can adopt the known product, a detailed description thereof will be omitted.

The optical system 7 includes a shutter 71 controlled by the controller 9 and controlling the light energy radiated from the light source 1, a neutral density (ND) filter 72 controlling a light intensity of the light energy passing through the shutter 71, a beam splitter 73 splitting and changing the direction of the light energy passing through the ND filter 72, prisms 74 controlling the light energy reflected on the beam splitter 73, and an objective lens 75 allowing the light energy transmitted from the prism 74 to focus on the predetermined portion of the photocurable resin 2.

Since the focus of the light energy passing through the objective lens 75 is formed on the photocurable resin 2, the photocurable resin 2 is cured to form the 2D structure 3.

The controller 9 controls the Z stage 5 and the XY stage 8 by using shape data of a product made by CAD and controls radiation of light energy generated from the light source 1 through the shutter 71.

Therefore, the photocurable resin 2 forms the 2D structure 3 divided into cross sections having a predetermine thickness and the 2D structures 3 repetitively formed are consecutively laminated to shape the sacrificial mold 10 which is the 3D structure.

Referring back to FIG. 2, in the manufacturing method of the exemplary embodiment, the shaping step (ST10) can shape the sacrificial mold 10 having the 3D structure by adopting the stereolithography technology in the known stereolithography device 100. The sacrificial mold 10 has a space into which the biomaterials 20 can be injected, that is, has a porous structure (see FIG. 4).

Figure 4:
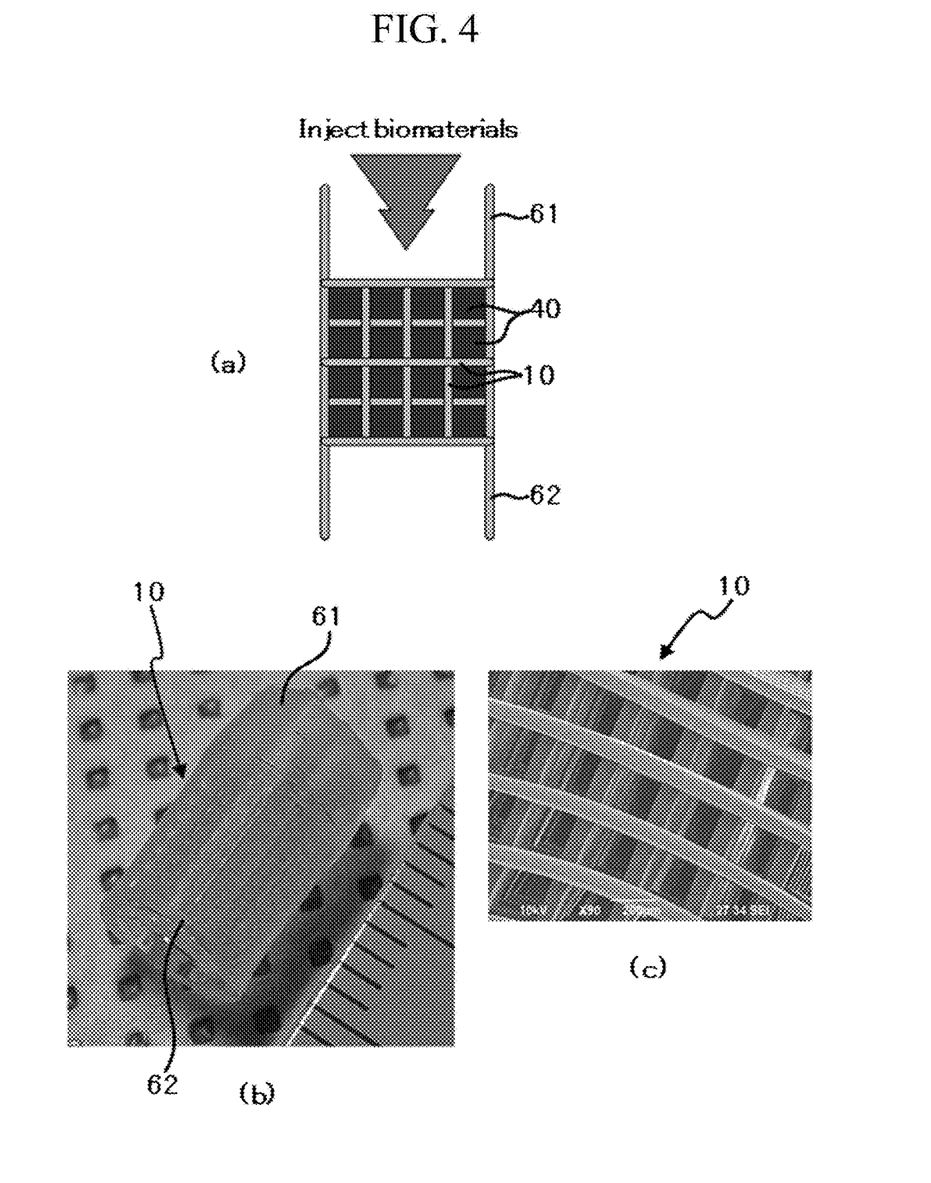
FIG. 4 illustrates a 3D sacrificial mold manufactured by a stereolithography technology of FIG. 3.

FIG. 4 illustrates a 3D sacrificial mold manufactured by a stereolithography technology of FIG. 3. Referring to FIG. 4, the 3D sacrificial mold 10 enables injection of the biomaterials 20 to enable the 3D structure 40 to be formed by the biomaterials 20.

The sacrificial mold 10 is connected to two connecting pipes 61 and 62 injecting the biomaterials 20 and discharging internal air during the injection (a, b) and has a structure corresponding to the 3D structure 40 to be shaped between the connecting pipes 61 and 62(a, c).

That is, the sacrificial mold 10 has an internal shape of the free 3D structure, that is, a porous structure between the connecting pipes 61 and 62.

At the injection step (ST20), the biomaterials 20 are injected into the shaped sacrificial mold 10. For this, a material of a liquid state is required to inject the biomaterials 20 into the sacrificial mold 10.

In the exemplary embodiment, the solvent 21 is used in order to prepare the biomaterials 20 of the liquid state. Most biomaterials 20 can be changed into the liquid state through a solvent process using the solvent 21. Further, the solvent process enables various kinds of biomaterials 20 to be utilized. The biomaterials 20 and the solvent 21 include those that are usable for a medical purpose.

In the exemplary embodiment, in order to utilize the availability, the biomaterials 20 include poly(DL-lactide-co-glycolic acid) (PLGA) and poly(L-Lactic acid) (PLLA) which are degradable synthetic polymers, chitosan and alginate which are degradable natural polymer, and PMMA-based bone cement which is a non-degradable biomaterial.

The biomaterials 20 such as PLGA and PLLA can be changed to the liquid state by using an organic solvent such as chloroform and dioxane and the biomaterials 20 such as chitosan and alginate can be changed to the liquid state by using an acetic acid solution and distilled water. However, the biomaterials and solvents that may be applicable to the manufacturing method of the present invention are not restricted to the above examples.

The biomaterials 20 prepared as above are injected and filled in a porous space within the sacrificial mold 10 manufactured by using a syringe 22 as shown in FIG. 2.

That is, the injection step (ST20) includes a step (ST21) of preparing the biomaterials 20 mixed with the solvent 21 and a step of (ST22) of injecting the biomaterials 20 with the solvent 21 into the porous space of the sacrificial mold 10 by means of the syringe 22.

At the curing step (ST30), after the biomaterials 20 prepared in the sacrificial mold 10 are injected together with the solvent 21, the solvent 21 is removed. The curing step (ST30) may be differently performed depending on the materials of the biomaterials 20. In the case of the biomaterials 20 such as PLGA and PLLA, the curing step (ST30) is performed by removing the organic solvent 21. The organic solvent 21 can be removed by a drying method in air or in vacuum or by using alcohol.

In the case of the biomaterials 20 such as chitosan or alginate which is the natural polymer, at the curing step (ST30), the solvent 21 can be removed by a freeze drying method and by using NAOH solution or a proper reaction solution such as $CaCl_2$.

At the completion step (ST40), after the curing step (ST30), the 3D structure 40 shaped by the residual biomaterials 20 is acquired by removing the sacrificial mold 10.

The completion step (ST40) as a process of removing the sacrificial mold 10 selectively removes the sacrificial mold 10 in a range not influencing the cured biomaterials 20. Complete removal of the sacrificial mold 10 completes the 3D structure 40 made of the biomaterials 20.

FIGS. 5A to 5E illustrate a product manufactured by a manufacturing method of FIG. 2. Referring to FIGS. 5A to 5E, in order to verify the availability of the manufacturing method, the 3D structure 40 manufactured by various biomaterials 20 is exemplified.

Figure 5A:
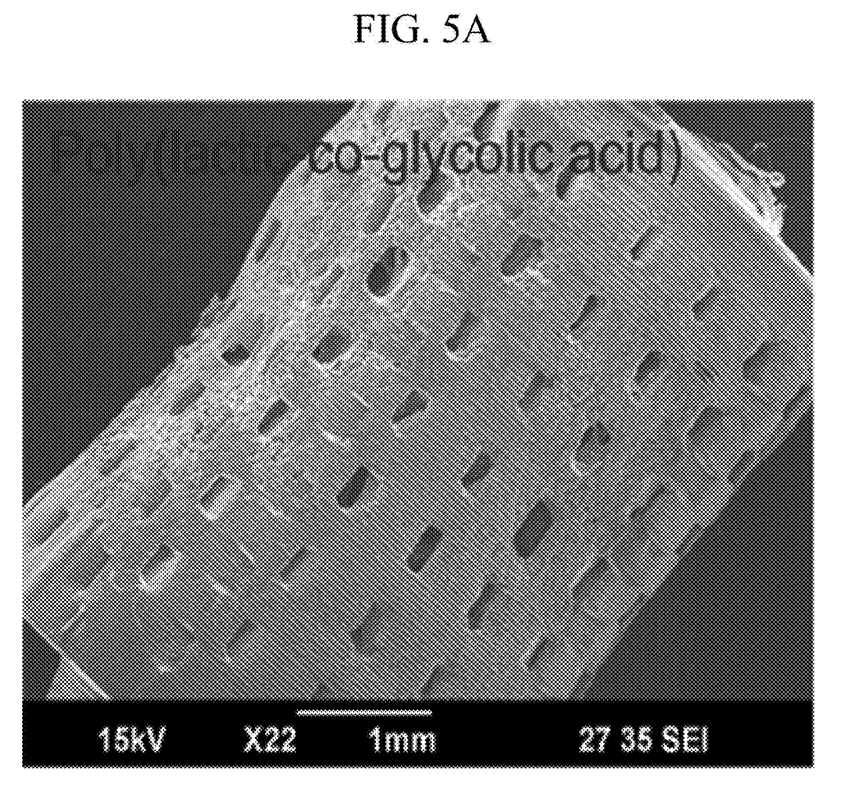
FIGS. 5A to 5E illustrate a product manufactured by a manufacturing method of FIG. 2.
Figure 5B:
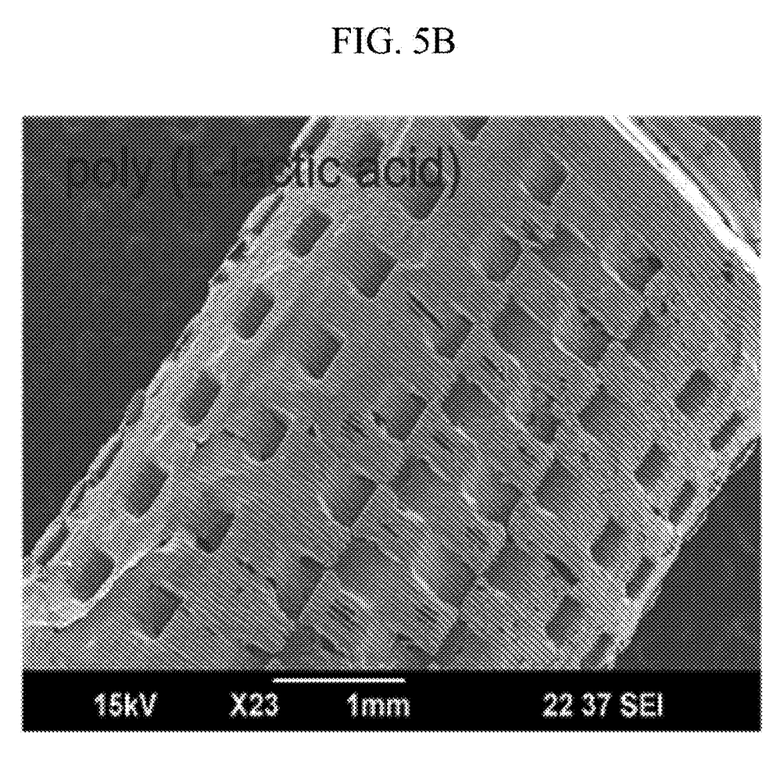
Figure 5C:
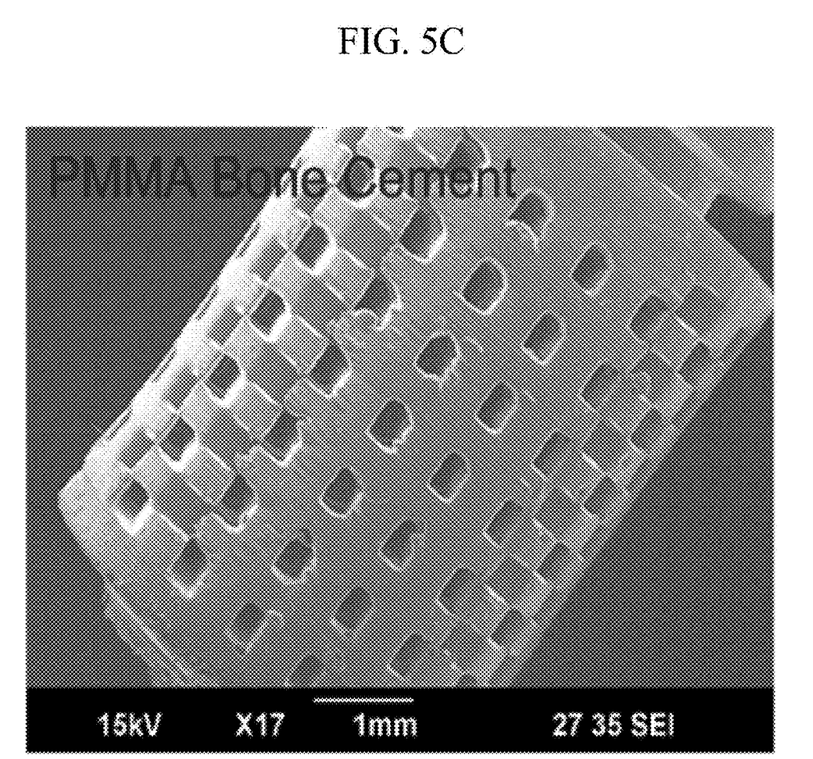
Figure 5D:
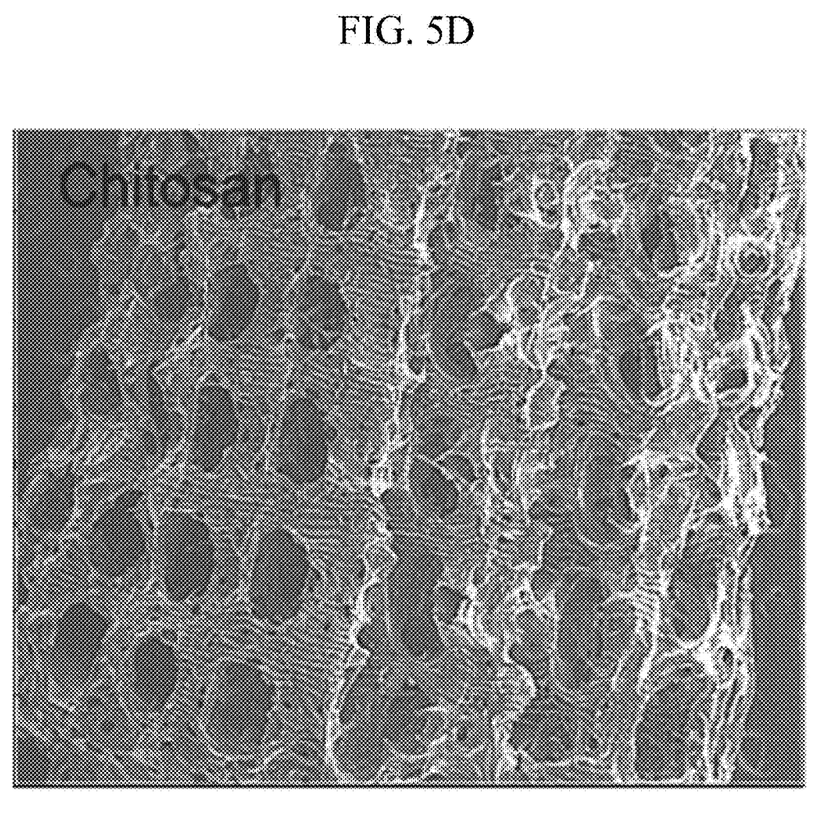
Figure 5E:
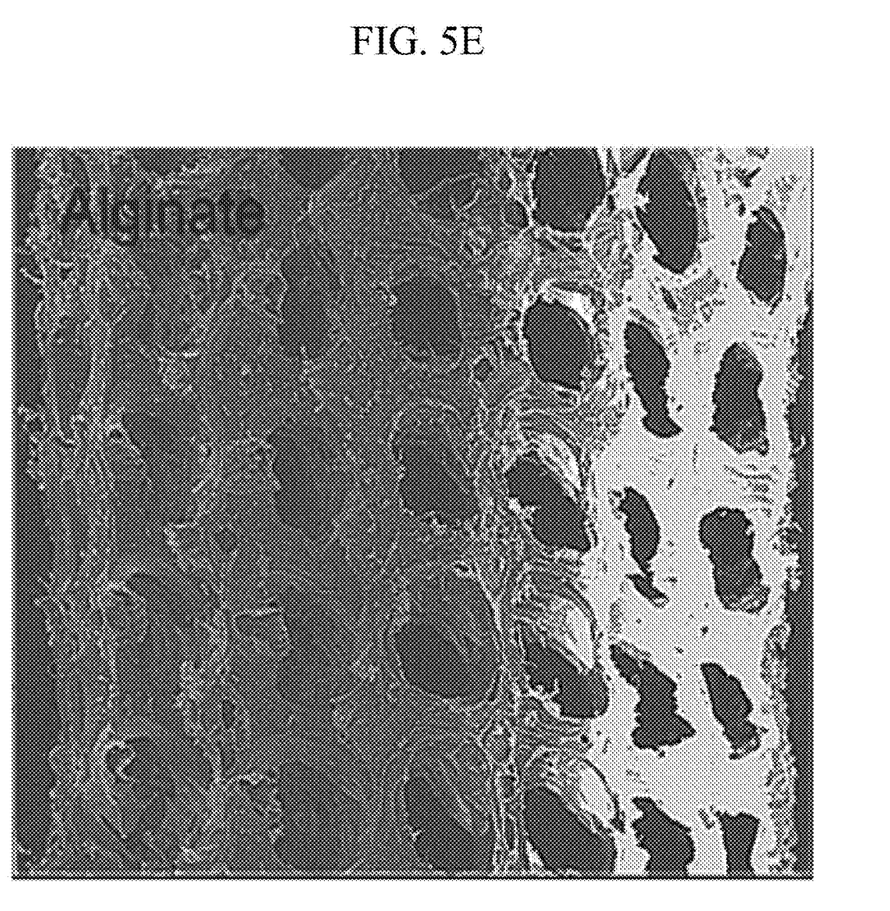

FIG. 5A illustrates a 3D structure 41 manufactured by poly(DL-lactide-co-glycolic acid) (PLGA), FIG. 5B illustrates a 3D structure 42 manufactured by poly(L-Latic acid) (PLLA), FIG. 5C illustrates a 3D structure 43 manufactured by the PMMA-based bone cement, FIG. 5D illustrates a 3D structure 44 manufactured by chitosan, and FIG. 5E illustrates a 3D structure 45 manufactured by alginate.

The 3D structures 40; 41 to 45 manufactured by various biomaterials 20 can grant a lot of availabilities to medial and biological fields requiring various structures and various biomaterials 20.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing method for a 3D structure of biomaterials using a stereolithography device, comprising:
   shaping a 3D sacrificial mold by using the stereolithography device, wherein the 3D sacrificial mold has a porous structure corresponding to an internal shape of the 3D structure;
   connecting connecting pipes to the 3D sacrificial mold,
   injecting prepared biomaterials into the 3D sacrificial mold by using a solvent;
   curing the biomaterials by removing the solvent injected into the sacrificial mold; and
   acquiring the 3D structure from the cured biomaterials by removing the 3D sacrificial mold
   wherein the biomaterials are injected through the connecting pipes and internal air in the 3D sacrificial mold is discharged through the connecting pipes.

2. The manufacturing method of claim 1, wherein:
   the shaping includes,
   shaping a 2D structure required by radiating light energy acquired from a light source of the stereolithography device to a predetermined portion of a photocurable resin; and
   shaping the 3D sacrificial mold of a 3D structure by laminating the 2D structure.

3. The manufacturing method of claim 1, wherein:
   the injecting includes,
   preparing the biomaterials mixed with the solvent; and
   injecting the biomaterials with the solvent into a porous space of the 3D sacrificial mold by using a syringe.

4. The manufacturing method of claim 3, wherein:
   at the preparing,
   the biomaterial is one of medically usable synthetic polymers, and
   the solvent is one of organic solvents.

5. The manufacturing method of claim 4, wherein:
   the synthetic polymer is one of PLGA and PLLA.

6. The manufacturing method of claim 4, wherein:
   the organic solvent is,
   one of chloroform and dioxane.

7. The manufacturing method of claim 3, wherein:
   at the preparing,
   the biomaterial is one of medically usable natural polymers and the solvent is one of solvents suitable for the biomaterial.

8. The manufacturing method of claim 7, wherein:
   the natural polymer is one of chitosan and alginate, and
   the solvent is one of acetic acid solution and distilled water.

9. The manufacturing method of claim 1, wherein:
   the biomaterial,
   is at least one medically usable of PLGA and PLLA which are a degradable synthetic polymer, chitosan and alginate which are a degradable natural polymer, and PMMA bone cement which is a non-degradable biomaterial.

10. A product manufactured by a manufacturing method for a 3D structure of biomaterials using a stereolithography device of claim 1.

* * * * *